United States Patent
Ohno

(10) Patent No.: US 12,020,029 B2
(45) Date of Patent: Jun. 25, 2024

(54) PROGRAM CONVERSION DEVICE, PROGRAM CONVERSION METHOD, AND PROGRAM CONVERSION PROGRAM

(71) Applicant: NEC Corporation, Tokyo (JP)

(72) Inventor: Yoshiyuki Ohno, Tokyo (JP)

(73) Assignee: NEC CORPORATION, Tokyo (JP)

( * ) Notice: Subject to any disclaimer, the term of this patent is extended or adjusted under 35 U.S.C. 154(b) by 390 days.

(21) Appl. No.: 17/617,361

(22) PCT Filed: Jun. 14, 2019

(86) PCT No.: PCT/JP2019/023652
§ 371 (c)(1),
(2) Date: Dec. 8, 2021

(87) PCT Pub. No.: WO2020/250420
PCT Pub. Date: Dec. 17, 2020

(65) Prior Publication Data
US 2022/0253313 A1  Aug. 11, 2022

(51) Int. Cl.
*G06F 9/30* (2018.01)
*G06F 8/41* (2018.01)
(Continued)

(52) U.S. Cl.
CPC ............ *G06F 9/30036* (2013.01); *G06F 8/41* (2013.01); *G06F 8/51* (2013.01); *G06F 9/3001* (2013.01);
(Continued)

(58) Field of Classification Search
None
See application file for complete search history.

(56) References Cited

U.S. PATENT DOCUMENTS

| 5,862,385 A | 1/1999 | Iitsuka |
| 5,930,507 A | 7/1999 | Nakahira et al. |

(Continued)

FOREIGN PATENT DOCUMENTS

| JP | H07-084799 A | 3/1995 |
| JP | H08-328870 A | 12/1996 |

(Continued)

OTHER PUBLICATIONS

International Search Report for PCT Application No. PCT/JP2019/023652, dated Sep. 3, 2019.

(Continued)

*Primary Examiner* — Michael Sun
(74) *Attorney, Agent, or Firm* — Sughrue Mion, PLLC

(57) ABSTRACT

A program conversion device 20 for converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, the program conversion device 20 includes a conversion unit 21 which converts the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

20 Claims, 17 Drawing Sheets

(51) Int. Cl.
    *G06F 8/51*           (2018.01)
    *G06F 12/0871*     (2016.01)

(52) U.S. Cl.
    CPC ...... *G06F 9/30047* (2013.01); *G06F 12/0871* (2013.01)

(56) References Cited

U.S. PATENT DOCUMENTS

| | | | | |
|---|---|---|---|---|
| 6,507,894 | B1 * | 1/2003 | Hoshi | G06F 12/0848 |
| | | | | 711/131 |
| 6,625,806 | B1 | 9/2003 | Ono et al. | |
| 9,164,679 | B2 * | 10/2015 | Smith | G06F 3/0659 |
| 2020/0364094 | A1 * | 11/2020 | Kahle | G06F 12/0842 |

FOREIGN PATENT DOCUMENTS

| | | |
|---|---|---|
| JP | H11-212798 A | 8/1999 |
| JP | 2000-172562 A | 6/2000 |
| JP | 2011-090492 A | 5/2011 |
| JP | 2013-175115 A | 9/2013 |

OTHER PUBLICATIONS

English translation of Written opinion for PCT Application No. PCT/JP2019/023652, dated Sep. 3, 2019.

* cited by examiner

FIG. 6

```
for(int j=0; j<1024; j++) { float b0 = B[0*1024+j] ;
    float b1 = B[1*1024+j] ;
    float b2 = B[2*1024+j] ;
    float b3 = B[3*1024+j] ;

for(int i=0; i<256; i++) {
        C0[i] += A[j*256+i] * b0 ;
        C1[i] += A[j*256+i] * b1 ;
        C2[i] += A[j*256+i] * b2 ;
        C3[i] += A[j*256+i] * b3 ;
    }
}
```

LOADING SCALAR MEMORY

VECTOR ARITHMETIC

FIG. 10 float b0 = B[0*1024+j] ;

float b1 = B[1*1024+j] ;

float b2 = B[2*1024+j] ;

float b3 = B[3*1024+j] ;

⇩

|     | b0    | b1   | b2   | b3    |
| --- | ----- | ---- | ---- | ----- |
| b0  | —     | 4096 | 8192 | 12288 |
| b1  | 4096  | —    | 4096 | 8192  |
| b2  | 8192  | 4096 | —    | 4096  |
| b3  | 12288 | 8192 | 4096 | —     |

FIG. 11

|    | b0 | b1 | b2 | b3 |
|----|----|----|----|----|
| b0 | —  | x  | x  | x  |
| b1 | x  | —  | x  | x  |
| b2 | x  | x  | —  | x  |
| b3 | x  | x  | x  | —  |

FIG. 12

```
for(int j=0; j<1024; j++) {
    float b0 = B[0*1024+j];
    float b1 = B[1*1024+j];      ARRAY B
    float b2 = B[2*1024+j];
    float b3 = B[3*1024+j];

for(int i=0; i<256; i++) {
        C0[i] += A[j*256+i] * b0 ;
        C1[i] += A[j*256+i] * b1 ;   ARRAY C
        C2[i] += A[j*256+i] * b2 ;
        C3[i] += A[j*256+i] * b3 ;
    }
}
```

FIG. 13

```
for(int j=0; j<1024; j++){
    float b0 = B[0*1024+j];
    float b1 = B[1*1024+j];
    float b2 = B[2*1024+j];
    float b3 = B[3*1024+j];

for(int i=0; i<256; i++){
        C0[i] += A[j*256+i] * b0 ;
        C1[i] += A[j*256+i] * b1 ;
        C2[i] += A[j*256+i] * b2 ;
        C3[i] += A[j*256+i] * b3 ;
    }
}
```

```
float B_tmp [4*1024];                                    S1 for(int j=0; j<1024; j++){                               S3
    B_tmp [j*4+0] = B[0*1024+j] ;
    B_tmp [j*4+1] = B[1*1024+j] ;
    B_tmp [j*4+2] = B[2*1024+j] ;
    B_tmp [j*4+3] = B[3*1024+j] ;
} for(int j=0; j<1024; j++){
    float b0 = B_tmp [j*4+0] ;                           S2
    float b1 = B_tmp [j*4+1] ;
    float b2 = B_tmp [j*4+2] ;
    float b3 = B_tmp [j*4+3] ;

for(int i=0; i<256; i++){
        C0[i] += A[j*256+i] * b0 ;
        C1[i] += A[j*256+i] * b1 ;
        C2[i] += A[j*256+i] * b2 ;
        C3[i] += A[j*256+i] * b3 ;
    }
}
```

FIG. 16

```
// EXPLICITLY INSTRUCT TO RELOCATE ARRAY B TO ANOTHER AREA WITH
VECTOR LOADING
# pragma vector_relocate(B)

for(int j=0; j<1024; j++){
    float b0 = B[0*1024+j] ;
    float b1 = B[1*1024+j] ;
    float b2 = B[2*1024+j] ;
    float b3 = B[3*1024+j] ;
    for(int i=0; i<256; i++) {
        C0[i] += A[j*256+i] * b0 ;
        C1[i] += A[j*256+i] * b1 ;
        C2[i] += A[j*256+i] * b2 ;
        C3[i] += A[j*256+i] * b3 ;
    }
}
```

SCALAR ARITHMETIC

A[0] = B[0] * C[0]

A[1] = B[1] * C[1]

．
．
．

A[99] = B[99] * C[99]

VECTOR ARITHMETIC

A[0:99] = B[0:99] * C[0:99]

A[0] = B[0] * C[0]
A[1] = B[1] * C[1]
．
．
．
A[99] = B[99] * C[99]

PROGRAM CONVERSION DEVICE, PROGRAM CONVERSION METHOD, AND PROGRAM CONVERSION PROGRAM

This application is a National Stage Entry of PCT/JP2019/023652 filed on Jun. 14, 2019, the contents of all of which are incorporated herein by reference, in their entirety.

TECHNICAL FIELD

The present invention relates to a program conversion device, a program conversion method, and a program conversion program, and in particular to a program conversion device, a program conversion method, and a program conversion program capable of optimizing an object program for a vector processor.

BACKGROUND ART

Vector arithmetic is a method of speeding up an arithmetic processing by executing the same arithmetic processing on multiple data in parallel.

FIG. 19 is an explanatory diagram showing an example of scalar arithmetic and vector arithmetic. As shown in FIG. 19, in scalar arithmetic, each multiplication processing is executed sequentially, one by one. Scalar arithmetic can be compared to a cart capable of making small turns.

Further, as shown in FIG. 19, in vector arithmetic, all the multiplication processing executed in scalar arithmetic shown in FIG. 19 are executed in parallel in a single instruction shown below. In the following instruction, it is instructed to multiply the corresponding elements of each vector by each other.

$$A[0:99]=B[0:99]*C[0:99]$$

In other words, a computation throughput of vector arithmetic is greater than that of scalar arithmetic because many of the same calculations are performed together in a single instruction. Vector arithmetic can be compared to a large truck that can be transported in large quantities.

Patent Literature (PTL) 1 describes an arithmetic processing device including a scalar processor and a vector processor. The arithmetic processing device described in PTL 1 can speed up cache miss detection of a scalar load instruction for a subsequent L1-cache during execution of a vector store instruction.

PTL 2 also describes a language processing device that can avoid the occurrence of thrashing by run-time routines each other when translating a source program to generate an object program.

PTL 3 also describes a compilation processing device that analyzes conflicting data on a cache memory at the time of translation to resolve the conflicts and also reduces the number of memory accesses to improve the execution performance of the translated program.

PTL 4 also describes a method of reducing the occurrence of a cache conflict for programs that cause significant performance degradation due to a cache conflict.

CITATION LIST

Patent Literature

PTL 1: Japanese Patent Application Laid-Open No. 2011-090492

PTL 2: Japanese Patent Application Laid-Open No. Hei 11-212798

PTL 3: Japanese Patent Application Laid-Open No. Hei 08-328870

PTL 4: Japanese Patent Application Laid-Open No. Hei 07-084799

SUMMARY OF INVENTION

Technical Problem

When a scalar arithmetic unit controls a vector arithmetic unit in a vector processor including the scalar arithmetic unit and the vector arithmetic unit, there is a possibility that arithmetic by the vector processor is delayed. PTLs 1-4 do not describe a method for solving the above problem.

OBJECT OF INVENTION

Therefore, it is an object of the present invention to provide a program conversion device, a program conversion method, and a program conversion program capable of speeding up arithmetic by a vector processor, which solve the above-described problem.

Solution to Problem

A program conversion device according to the present invention is a program conversion device for converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, includes a conversion unit which converts the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

A program conversion method according to the present invention is a program conversion method implemented by a program conversion device for converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, includes converting the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

A program conversion program according to the present invention causes a computer to execute a conversion process of converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

Advantageous Effects of Invention

According to the present invention, it is possible to speed up arithmetic by the vector processor.

BRIEF DESCRIPTION OF DRAWINGS

FIG. 6 is an explanatory diagram showing an example of source code in which cache thrashing occurs in a scalar cache memory 1112.

FIG. 10 is an explanatory diagram showing an example of detecting cache thrashing by a thrashing detection unit 110.

FIG. 11 is an explanatory diagram showing another example of detecting cache thrashing by the thrashing detection unit 110.

FIG. 12 is an explanatory diagram showing another example of source code in which cache thrashing occurs in the scalar cache memory 1112.

FIG. 13 is an explanatory diagram showing an example of converting source code by a data access conversion unit 130.

FIG. 16 is an explanatory diagram showing another example of source code in which cache thrashing occurs in the scalar cache memory 1112.

DESCRIPTION OF EMBODIMENTS

Figure 1:
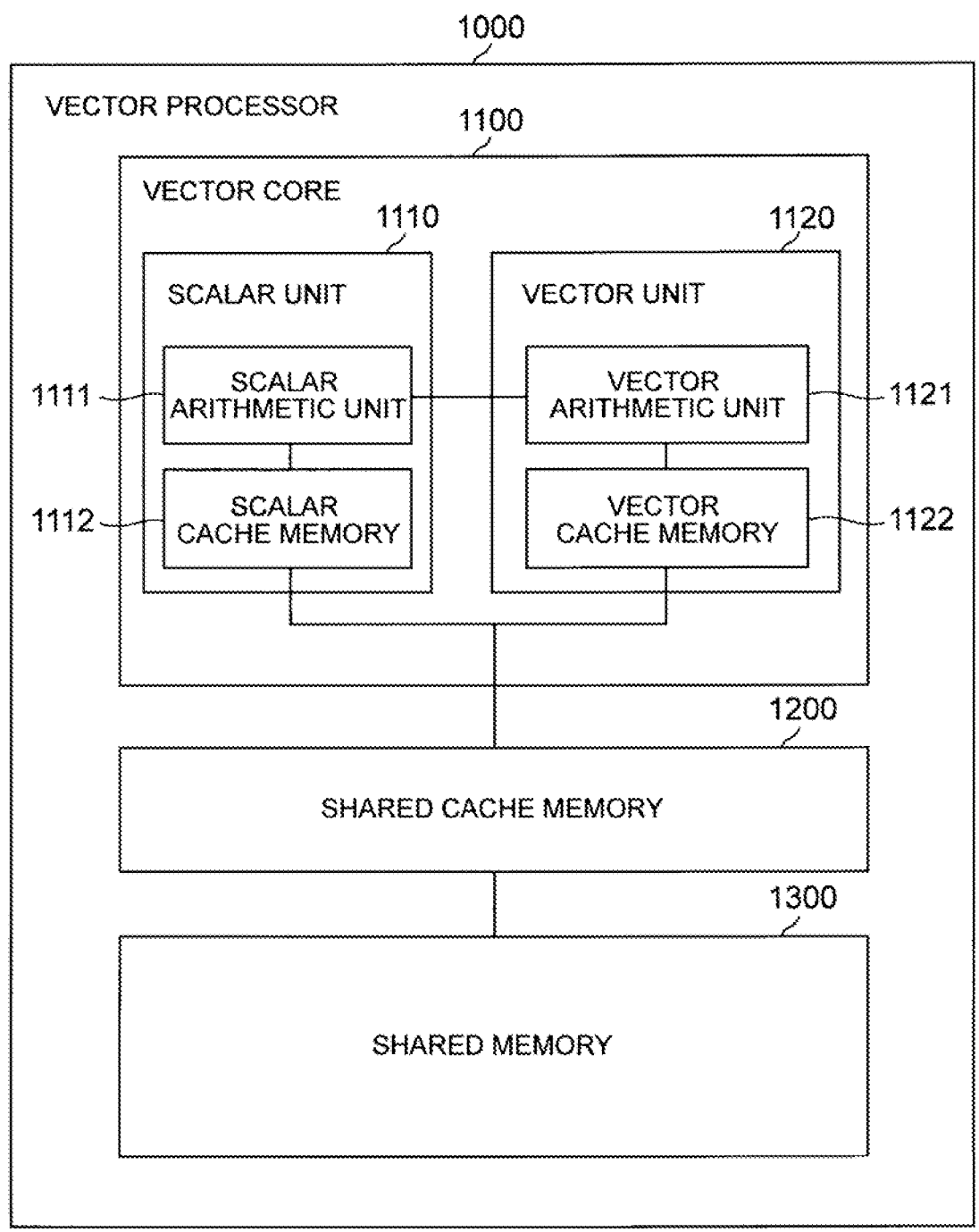
FIG. 1 is a block diagram showing an example of the configuration of a typical vector processor.

First, the reason why arithmetic by a vector processor may be delayed will be explained in detail. FIG. 1 is a block diagram showing an example of the configuration of a typical vector processor.

As shown in FIG. 1, a vector processor 1000 comprises a vector core 1100, a shared cache memory 1200, and a shared memory 1300. The vector core 1100, the shared cache memory 1200, and the shared memory 1300 are communicatively connected. The vector processor 1000 may comprise a plurality of vector cores.

As shown in FIG. 1, the vector core 1100 includes a scalar unit 1110 and a vector unit 1120. The scalar unit 1110 has a scalar arithmetic unit 1111 and a scalar cache memory 1112. The vector unit 1120 has a vector arithmetic unit 1121 and a vector cache memory 1122.

The shared memory 1300 has a function of storing data used in scalar or vector arithmetic. The shared memory 1300 is accessible from both the scalar arithmetic unit 1111 and the vector arithmetic unit 1121.

The shared cache memory 1200 has a function of storing data stored in the shared memory 1300 as cache data. The shared cache memory 1200 is accessible from both the scalar arithmetic unit 1111 and the vector arithmetic unit 1121.

The scalar arithmetic unit 1111 has a function of performing scalar arithmetic. In addition, the scalar cache memory 1112 has a function of storing data for scalar arithmetic among data stored in the shared memory 1300 as cache data.

The vector arithmetic unit 1121 has a function of performing vector arithmetic. In addition, the vector cache memory 1122 has a function of storing data for vector arithmetic among data stored in the shared memory 1300 as cached data. Note that the vector cache memory 1122 need not be included in the vector unit 1120.

That is, similar to a general-purpose processor, the vector processor 1000 has a hierarchy consisting of a memory and a cache memory. In addition, each arithmetic unit can access the cache memory closer to itself at a higher speed. The size of the scalar cache memory 1112 and the size of the vector cache memory 1122 are smaller than the size of the shared cache memory 1200.

In addition, the scalar arithmetic unit 1111 operates in cooperation with the vector arithmetic unit 1121 by controlling the vector arithmetic unit 1121. For example, when instructed to execute an arbitrary program, the scalar arithmetic unit 1111 instructs the vector arithmetic unit 1121 to execute a process in which vector arithmetic is possible within the target program.

In addition, the scalar arithmetic unit 1111 executes a process in which vector arithmetic is difficult in the target program. That is, in the vector core 1100, a relationship is established in which the scalar unit 1110 is the "main" and the vector unit 1120 is the "subordinate". Therefore, if the processing of either of the scalar arithmetic unit 1111 or the vector arithmetic unit 1121 is slow, the execution of the target program will be delayed as a whole.

Figure 2:
FIG. 2 is an explanatory diagram showing an example of each arithmetic time of a scalar arithmetic unit 1111 and a vector arithmetic unit 1121.

FIG. 2 is an explanatory diagram showing an example of each arithmetic time of the scalar arithmetic unit 1111 and the vector arithmetic unit 1121. The "S" shown in FIG. 2 represents the scalar arithmetic unit 1111. Also, "V" shown in FIG. 2 represents the vector arithmetic unit 1121.

As shown in FIG. 2, the scalar arithmetic unit 1111 instructs the vector arithmetic unit 1121 to perform vector arithmetic in the middle of the scalar arithmetic. When the vector arithmetic is completed, the scalar arithmetic unit 1111 starts the next scalar arithmetic. Accordingly, the scalar arithmetic by the scalar arithmetic unit 1111 and the vector arithmetic by the vector arithmetic unit 1121 are executed without interruption.

In the example shown in FIG. 2, the arithmetic time of the vector arithmetic unit 1121 which has a large computation throughput is longer than the arithmetic time of the scalar arithmetic unit 1111 which has a small computation throughput. Therefore, the arithmetic time shown in FIG. 2 is an ideal arithmetic time when the scalar arithmetic unit 1111 and the vector arithmetic unit 1121 are in operation.

Figure 3:
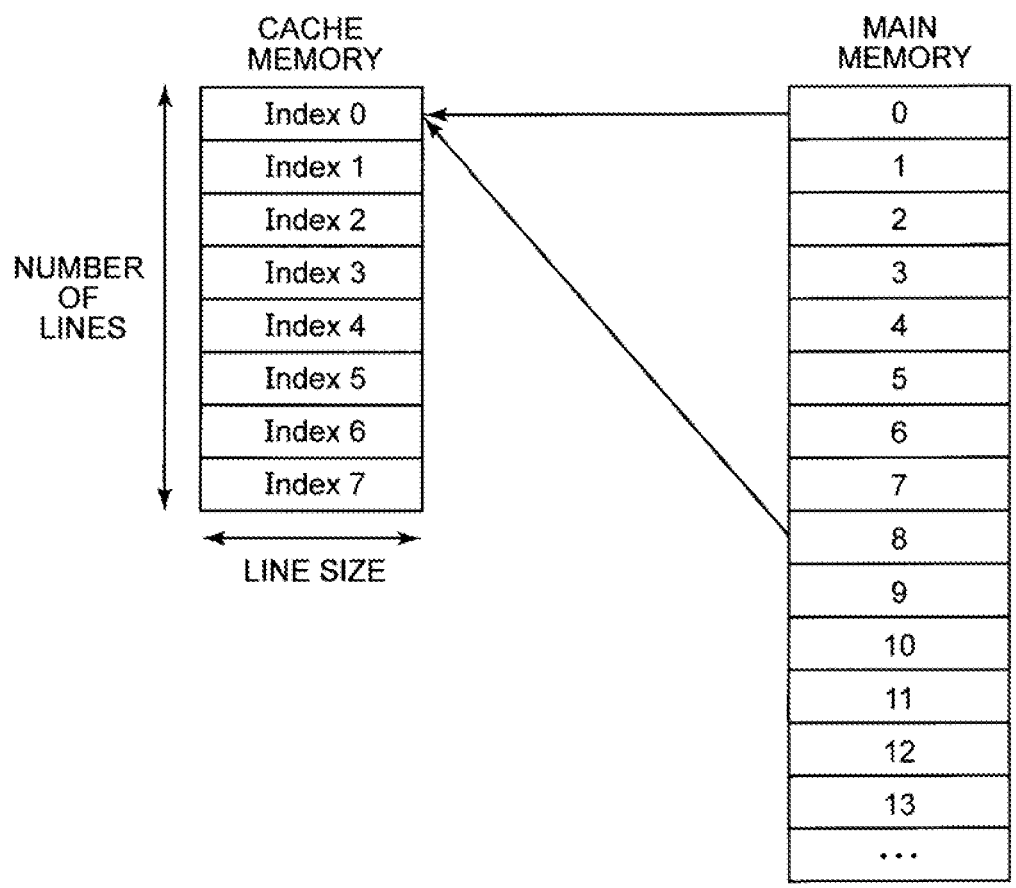
FIG. 3 is an explanatory diagram showing an example of a relationship between a cache memory and a main memory.

In the following, a problem that occur in the hierarchy consisting of main memory and cache memory is explained. FIG. 3 is an explanatory diagram showing an example of a relationship between a cache memory and a main memory.

Note that, in the vector processor 1000, the shared memory 1300 corresponds to the main memory shown in FIG. 3. The scalar cache memory 1112 corresponds to the cache memory shown in FIG. 3.

The "Index 0", "Index 1", . . . , and "Index 7" of the cache memory shown in FIG. 3 are the identification numbers of cache lines, which are units that are grouped together to some extent. The vertical width of the cache memory represents the number of lines. In addition, the width of the cache memory represents the line size. In the cache memory, cache data is managed for each cache line.

Each number in the main memory shown in FIG. 3 is an address representing the location where the data is stored. In the example shown in FIG. 3, the size of the cache line and the size of the data indicated by one address in the main memory are equal.

In the example shown in FIG. 3, a predetermined address range of the main memory is allocated to one cache line. In other words, the cache memory and the main memory shown in FIG. 3 are related by the direct mapping method.

The cache line in which the main memory data is stored is determined by the address of the main memory. In the example shown in FIG. 3, this is determined by the remainder obtained by dividing the address of the main memory by the number of cache lines.

For example, the remainder of "0" and "8" divided by "8", the number of cache lines, is 0 for both. Therefore, as shown in FIG. 3, the data with address number 0 and the data with address number 8 are both stored in the cache line of Index 0.

In the example shown in FIG. 3, if data number 8 is accessed while data number 0 is stored in the cache line of Index 0, the data stored in the cache line of Index 0 is replaced from data number 0 to data number 8.

Hereinafter, the replacement of data stored in a cache line is referred to as a cache line conflict. In addition, the degradation of access performance due to frequent cache line conflicts is referred to as cache thrashing.

Figure 4:
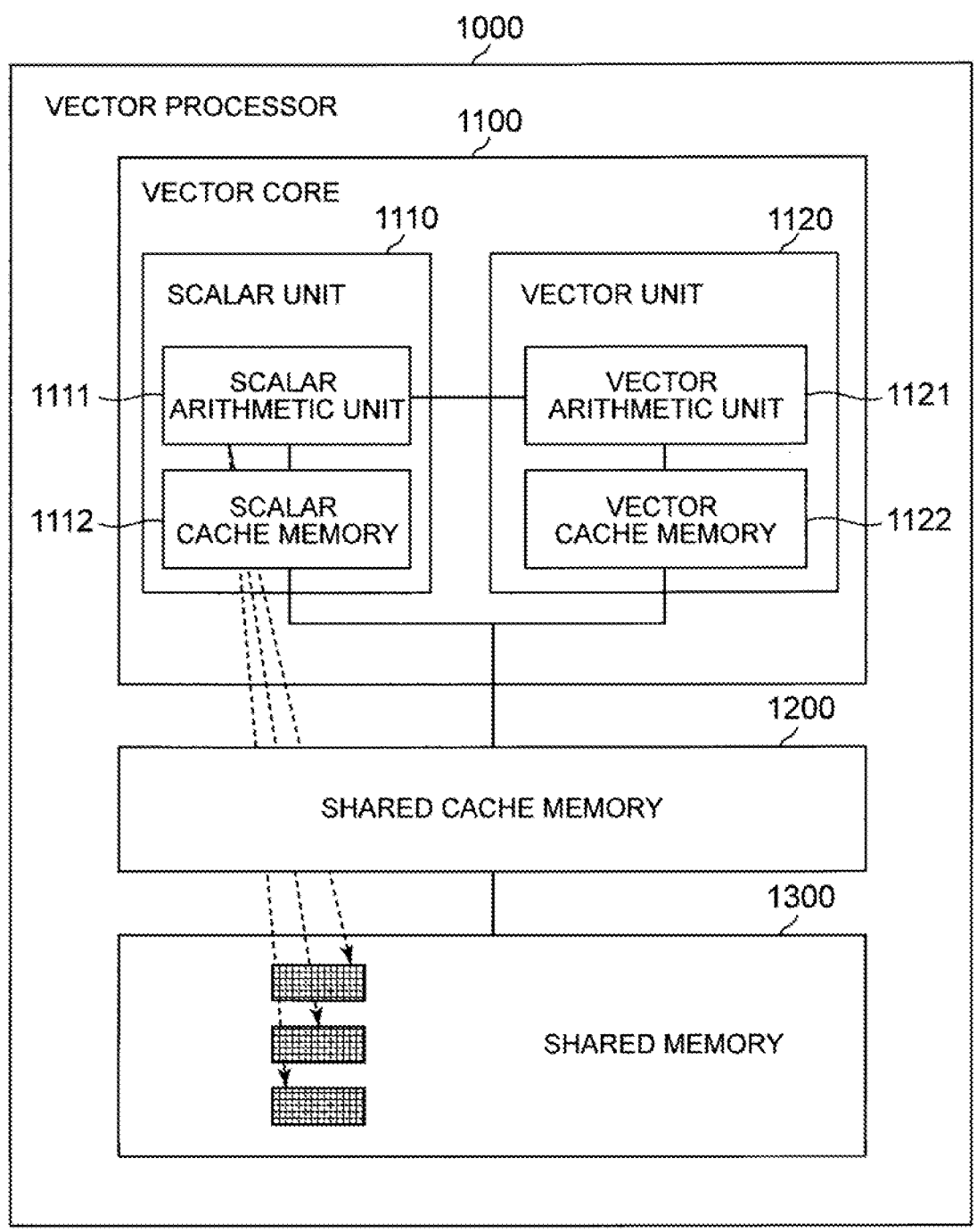
FIG. 4 is a block diagram showing an example of access to a shared memory 1300 by a scalar unit 1110.

FIG. 4 is a block diagram showing an example of access to the shared memory 1300 by the scalar unit 1110. Each rectangle in the grid pattern shown in FIG. 4 represents data to be accessed indicated by each address. In addition, the dashed arrows shown in FIG. 4 represent accesses to data. In the example shown in FIG. 4, a scalar arithmetic unit 1111 accesses a plurality of data whose addresses are far apart.

When multiple data whose addresses are far apart are accessed, the cache thrashing is likely to occur in the scalar cache memory 1112. The reason for this is that, as shown in FIG. 3, the probability of cache line conflict occurring is higher when multiple data whose addresses are far apart are accessed than when multiple data whose addresses are contiguous are accessed.

Figure 5:
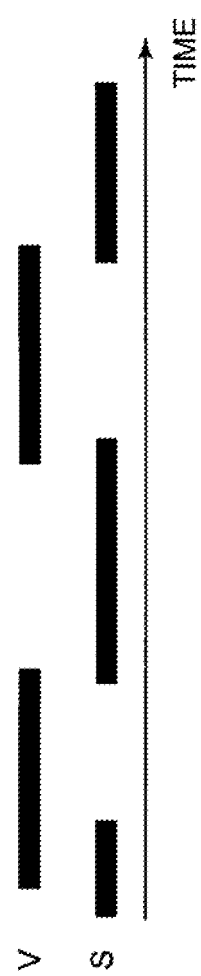
FIG. 5 is an explanatory diagram showing another example of each arithmetic time of the scalar arithmetic unit 1111 and the vector arithmetic unit 1121.

FIG. 5 is an explanatory diagram showing another example of each arithmetic time of the scalar arithmetic unit 1111 and the vector arithmetic unit 1121. When cache thrashing occurs frequently in the scalar cache memory 1112, the arithmetic time of the scalar arithmetic unit 1111 is prolonged due to a decrease in access performance, as shown in FIG. 5.

If the arithmetic time of the scalar arithmetic unit 1111 is prolonged, the timing at which the scalar arithmetic unit 1111 instructs the vector arithmetic unit 1121 to perform vector arithmetic is delayed. Therefore, as shown in FIG. 5, the time when the vector arithmetic unit 1121 does not perform vector arithmetic increase compared to the example shown in FIG. 2. That is, since the time when the vector arithmetic unit 1121, which has a large computation throughput, does not perform arithmetic increase, the performance of the vector core 1100 decreases as a whole.

FIG. 6 is an explanatory diagram showing an example of source code in which cache thrashing occurs in the scalar cache memory 1112. The source code shown in FIG. 6 is source code that is the generation source of the object program executed by the vector processor 1000.

The structure of the source code shown in FIG. 6 is a loop structure including scalar memory loading and vector arithmetic. The scalar arithmetic unit 1111 performs scalar memory loading. The vector arithmetic unit 1121 performs vector arithmetic.

In the scalar memory loading shown in FIG. 6, the scalar arithmetic unit 1111 allocate data stored in the shared memory 1300 to each variable one by one. As shown in FIG. 6, the data whose addresses are 1024 apart is allocated to variables b0 and b1, respectively. For variables b1 and b2, and for variables b2 and b3, the data whose addresses are 1024 apart are also allocated respectively.

In other words, since multiple data whose addresses are far apart are accessed, cache line conflict may occur when each variable is stored in a cache line of the scalar cache memory 1112.

As described above, when many caches line conflicts occur frequently, cache thrashing occurs, which decrease the performance of the scalar arithmetic unit 1111. A solution to the above problem in the present invention is described below.

Example Embodiment 1

Figure 7:
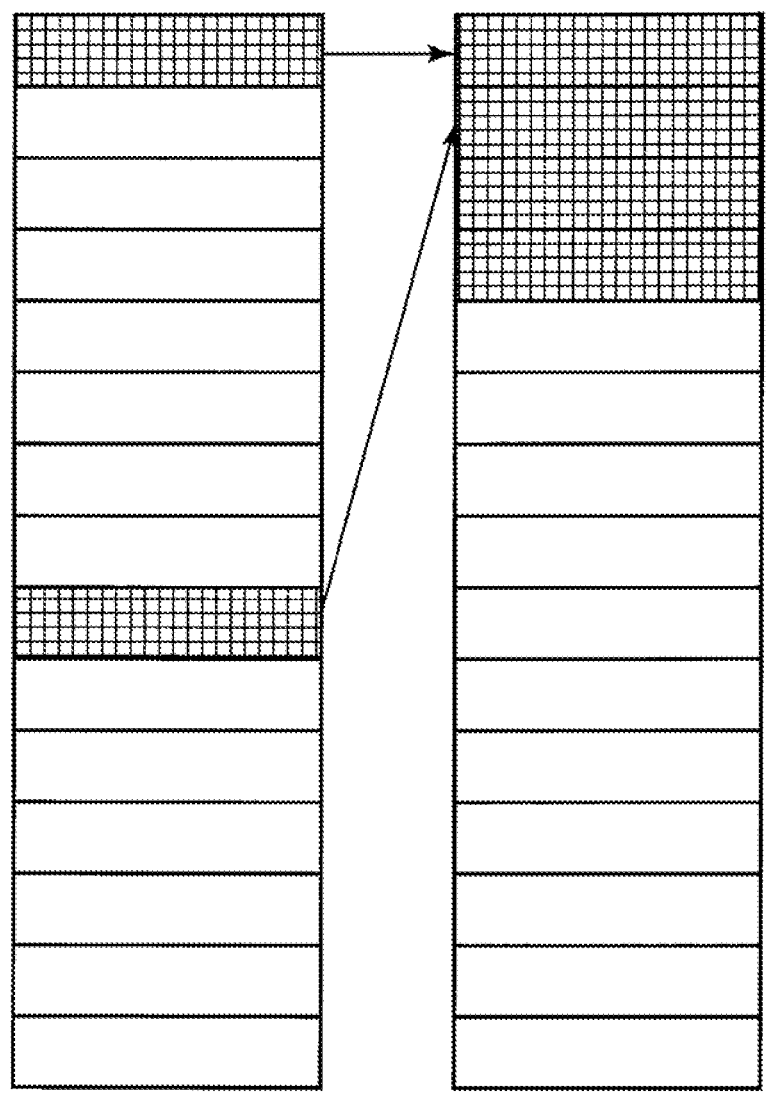
FIG. 7 is an explanatory diagram showing an example of converting the arrangement of data stored in the main memory.

First, a method for suppressing the occurrence of cache thrashing in the scalar cache memory 1112, which is the above problem, will be described. FIG. 7 is an explanatory diagram showing an example of converting the arrangement of data stored in the main memory.

When a scalar arithmetic unit 1111 accesses a plurality of data whose addresses are far apart as shown on the left of FIG. 7, there is a high possibility that cache thrashing will occur in the scalar cache memory 1112. Therefore, in order to reduce the possibility of cache thrashing occurring, a method of converting the arrangement of data so that the addresses of the plurality of data to be accessed are contiguous, as shown on the right in FIG. 7, is considered.

Figure 8:
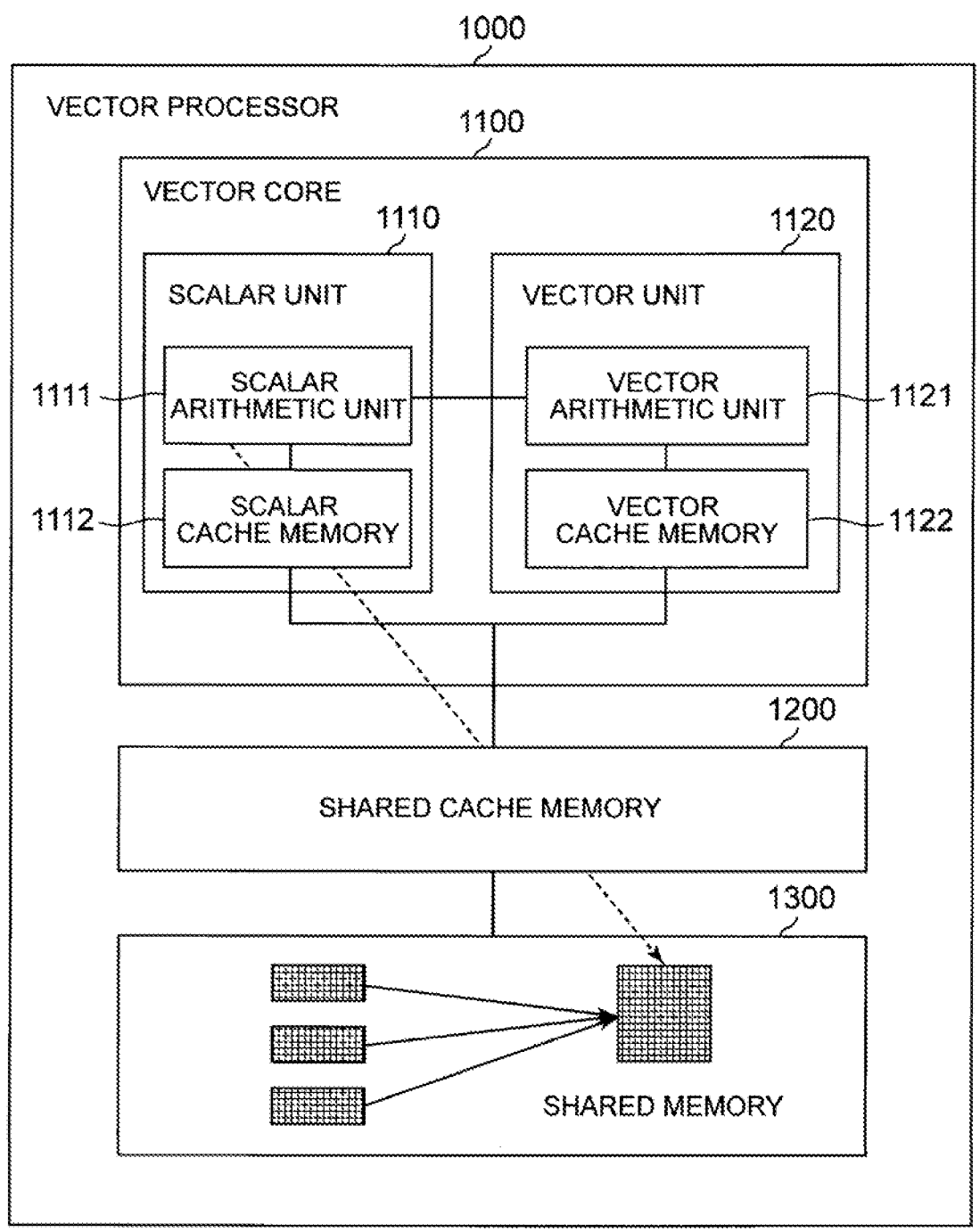
FIG. 8 is a block diagram showing another example of access to the shared memory 1300 by the scalar unit 1110.

FIG. 8 is a block diagram showing another example of access to the shared memory 1300 by the scalar unit 1110. In the example shown in FIG. 8, in order to reduce the possibility of cache thrashing occurring, the vector arithmetic unit 1121 copies the data that is to be used by the scalar unit 1110 to a different area, based on the method shown in FIG. 7. The solid arrows shown in FIG. 8 represent the copying of data.

The scalar arithmetic unit 1111 refers to the data to be copied. As shown in FIG. 8, the data is copied so that the addresses of the plurality of data to be accessed are contiguous. Therefore, it is considered that the possibility of cache thrashing occurring in the scalar cache memory 1112 is reduced. Hereinafter, the program conversion device according to the present invention, which is a specific solution for realizing the above method, will be described.

Description of Configuration

Figure 9:
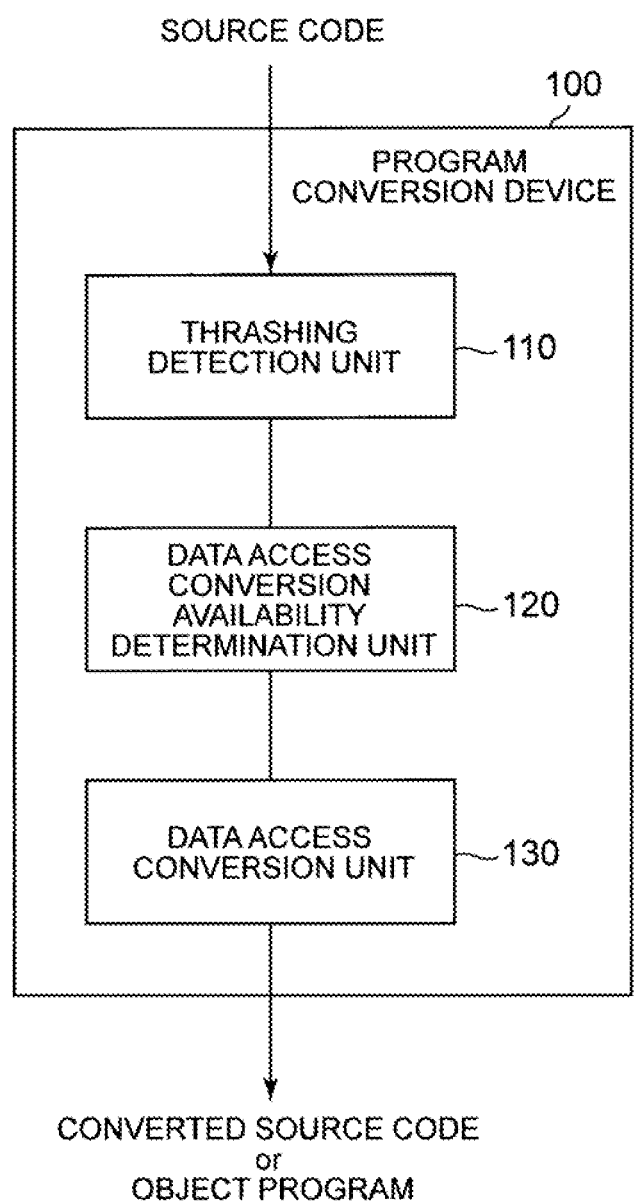
FIG. 9 is a block diagram showing an example of the configuration of a program conversion device of the first example embodiment of the present invention.

Hereinafter, the example embodiment of the present invention is described with reference to the drawings. FIG. 9 is a block diagram showing an example of the configuration of the program conversion device of the first example embodiment of the present invention. As shown in FIG. 9, the program conversion device 100 of the present example embodiment includes a thrashing detection unit 110, a data access conversion availability determination unit 120, and a data access conversion unit 130.

As shown in FIG. 9, the source code as shown in FIG. 6 is input to the program conversion device 100. The thrashing detection unit 110 has a function of detecting, by analyzing the input source code, a process in which cache thrashing occurs in the scalar cache memory 1112 among the processes represented by the source code.

In addition, the data access conversion availability determination unit 120 has a function of determining whether or not data access conversion is possible, which copies data to be accessed by the scalar arithmetic unit 1111 to another area in the shared memory 1300, and makes the scalar arithmetic unit 1111 access the data in the copy destination.

The data access conversion unit 130 has a function of converting a structure of source code so as to make the vector arithmetic unit 1121 copy data to be accessed by the scalar arithmetic unit 1111 to another area, and make the scalar arithmetic unit 1111 access the data in the copy destination.

As shown in FIG. 9, the data access conversion unit 130 outputs the source code after the conversion. The data access conversion unit 130 may output an object program which is compiled source code. Hereinafter, the specific operation of each component will be described.

FIG. 10 is an explanatory diagram showing an example of detecting cache thrashing by the thrashing detection unit 110. In this example, the case where the source code shown in FIG. 6 is input to the program conversion device 100 is considered.

The thrashing detection unit 110 detects a loop structure including scalar memory loading and vector arithmetic in the source code shown in FIG. 6. Next, the thrashing detection unit 110 computes a distance between the data to be accessed in the scalar memory loading (hereinafter, referred to as an access distance).

FIG. 10 shows a list of the data to be accessed in scalar memory loading and the computed access distance. The thrashing detection unit 110 computes the access distance by computing a difference of indices of each element of an array and multiplying a size of the array type by the difference. For example, the thrashing detection unit 110 computes the access distance between the variables b0 and b1 as follows.

$$4[\text{Byte, float type}] * ((1 * 1024 + j) - (0 * 1024 + j)) = 4 * 1024 = 4096$$

The unit of the access distance is Byte. Since the type of the array is a float type, the difference is multiplied by 4 Bytes. Next, the thrashing detection unit 110 determines whether or not a cache line conflict of the scalar cache memory 1112 occurs in the scalar memory loading. For example, the thrashing detection unit 110 determines that a cache line conflict occurs when all of the following three conditions are satisfied.

1. access distance is constant
2. access distance>cache line size
3. (access distance % cache memory size)<=cache line size Here, the condition 2 is a condition to check whether or not each data is stored in the same cache line. If the access distance is smaller than the cache line size, each data is stored in the same cache line, thus the data is not a conflict target.

The (access distance % cache memory size) in the condition 3 is the remainder obtained by dividing the access distance by the cache memory size. If the remainder is less than or equal to the cache line size, then multiple data are allocated to a single cache line as shown in FIG. 3.

For example, when a processor using a cache memory with 64 cache lines of size 64 Bytes executes the scalar memory loading shown in FIG. 6, the condition 2 is satisfied for all combinations of data because the access distances are all greater than 64 Bytes.

In addition, since the cache memory size is 4096 Bytes and the remainders obtained by dividing the access distances by the cache memory size are all less than or equal to the cache line size, the condition 3 is satisfied for all combinations of data.

Therefore, there is a possibility that cache line conflicts occur between respective data. Specifically, there is a possibility that the variable b1 is stored in the same cache line after the variable b0, which is stored in any cache line, is driven out. Also, there is a possibility that the variable b2 is stored in the same cache line after the variable b1 is driven out, and the variable b3 is stored in the same cache line after the variable b2 is driven out.

Figure 11:
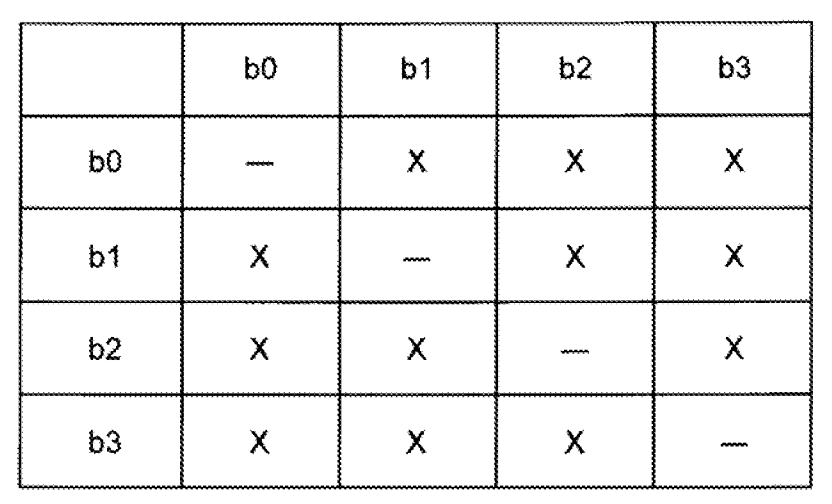

FIG. 11 is an explanatory diagram showing another example of detecting cache thrashing by the thrashing detection unit 110. The "X" shown in FIG. 11 means that there is a possibility that a cache line conflict may occur between the data. In this example, there is a possibility of a cache line conflict between any of the data as shown in FIG. 11.

After the possibility that cache thrashing occurs for each variable of the scalar memory loading shown in FIG. 6 is detected, the data access conversion availability determination unit 120 checks whether or not there is a write by another arithmetic in the area accessed by the scalar memory loading. If there is a write by another arithmetic, the data access conversion availability determination unit 120 determines that a data access conversion is not possible.

FIG. 12 is an explanatory diagram showing another example of source code in which cache thrashing occurs in the scalar cache memory 1112. The array B shown in FIG. 12 is an array that is accessed by the scalar arithmetic unit 1111 in scalar memory loading. Also, the array C shown in FIG. 12 is an array that is written by the vector arithmetic unit 1121 with vector arithmetic.

To determine whether a data access conversion is possible, the data access conversion availability determination unit 120 checks whether the area in the shared memory 1300 in which the array B is stored and the area in which the array C is stored are different. Since the two areas are different, the data access conversion availability determination unit 120 determines that a data access conversion for the array B is possible.

After it is determined that a data access conversion for the array B in the scalar memory loading shown in FIG. 6 is possible, the data access conversion unit 130 converts the input source code. FIG. 13 is an explanatory diagram showing an example of converting source code by the data access conversion unit 130.

The source code before the conversion is shown on the left side in FIG. 13. The solid rectangle in the source code before the conversion represents the target of the data access conversion (array B).

For example, the data access conversion unit 130 converts the source code as shown to the right side in FIG. 13. First, the data access conversion unit 130 allocates a temporary area of the same size as the area in which the array B is stored (step S1). In the example shown in FIG. 13, the array B_tmp[4*1024] is allocated.

Next, the data access conversion unit 130 changes the source code so that the scalar memory loading is performed from the first element of the temporary area (step S2). In the example shown in FIG. 13, for example, the element B[0*1024+j] is changed to the element B_tmp[j*4+0].

Next, the data access conversion unit 130 generates source code that copies the data of the original array to the temporary area (step S3). When the process represented by the source code generated in step S3 is executed, all of the data of the array B is copied to the array B_tmp.

By the source code shown in FIG. 13, data is copied by vector arithmetic so that the addresses of the plurality of data to be accessed are contiguous by the vector arithmetic unit 1121. Since the scalar loading is executed after the data is copied, the possibility of cache thrashing occurring in the scalar cache memory 1112 is reduced. Accordingly, the program conversion device 100 can convert the source code so that the performance of the vector processor 1000 is improved as a whole.

Figure 14:
FIG. 14 is an explanatory diagram showing another example of converting source code by the data access conversion unit 130.

The data access conversion unit 130 may make the size of the temporary area smaller than the size of the original array. FIG. 14 is an explanatory diagram showing another example of converting source code by the data access conversion unit 130.

The left side in FIG. 14 shows the converted source code shown in FIG. 13. The right side in FIG. 14 shows the further converted source code. The part in bold in the source code shown on the right of FIG. 14 is the part that has been further converted.

Specifically, the array B_tmp[4*1024] is replaced with the array B_tmp[4*256] whose size is one-fourth. In addition, with the replacement of the array, the entire process is converted so that it loops four times. Even if the further converted source code shown in FIG. 14 is used, the result obtained is the same.

The advantage of making the size of the temporary area smaller than the size of the original array is that the consumption of the shared memory 1300 can be reduced. The shared memory 1300 is finite, and it is not always possible to allocate a temporary area of the same size as the original array. By allocating a temporary area smaller than the original array, the consumption of the shared memory 1300 is reduced.

Description of Operation

Figure 15:
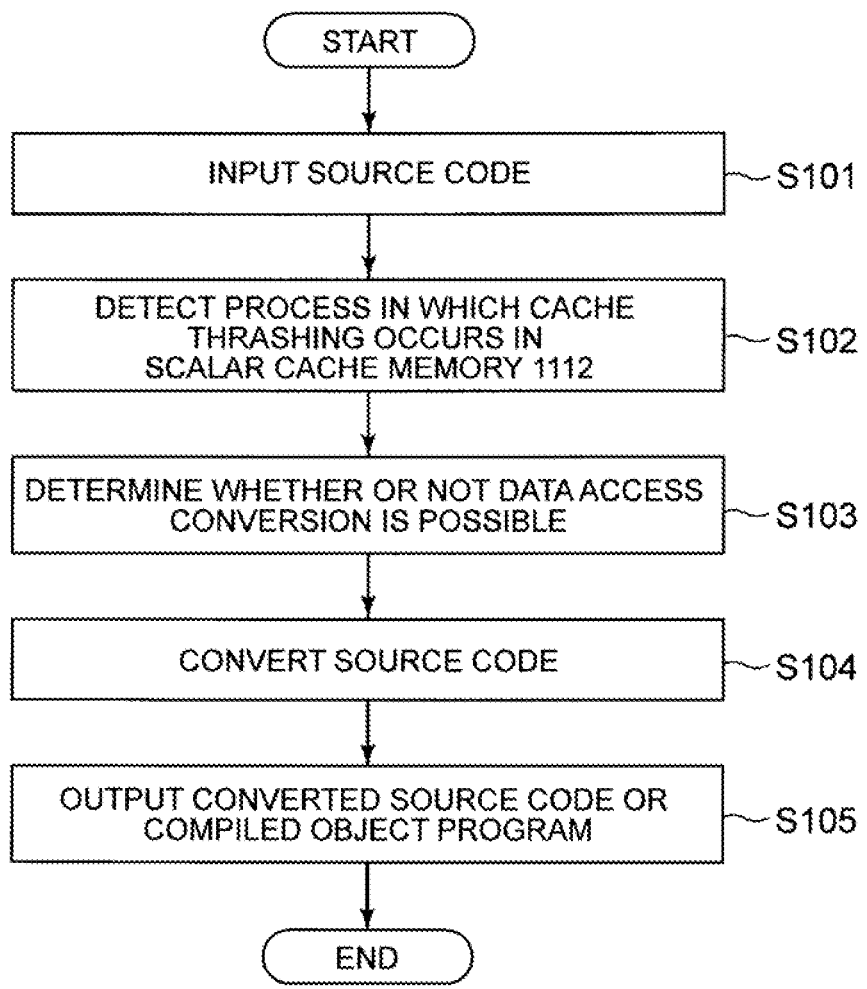
FIG. 15 is a flowchart showing an operation of the program conversion process by a program conversion device 100 of the first example embodiment.

The operation of the program conversion device 100 of this example embodiment will be described below with reference to FIG. 15. FIG. 15 is a flowchart showing an operation of the program conversion process by the program conversion device 100 of the first example embodiment.

First, source code to be converted is input to the thrashing detection unit 110 in the program conversion device 100 (step S101). Next, the thrashing detection unit 110 detects, among the processes represented by the input source code, a process in which cache thrashing occurs in the scalar cache memory 1112 (step S102).

Next, the data access conversion availability determination unit 120 determines whether or not a data access conversion to the data accessed by the scalar arithmetic unit 1111 is possible in the process in which the detected cache thrashing occurs (step S103).

Next, the data access conversion unit 130 converts the source code with respect to the data for which it has been determined that data access conversion is possible (step S104).

Next, the data access conversion unit 130 outputs the converted source code or the object program to which the source code is compiled (step S105). After outputting it, the program conversion device 100 terminates the program conversion process.

Description of Effect

The data access conversion unit 130 in the present example embodiment converts the source code so that: the vector arithmetic unit 1121 is caused to copy a plurality of data, which are stored in separate areas within the shared memory 1300 accessed by the scalar arithmetic unit 1111 during the process indicated by the source code, to a single different area from the areas in the shared memory 1300; and the scalar arithmetic unit 1111 is caused to access the single different area instead of the separate areas.

Further, the thrashing detection unit 110 in the present example embodiment detects the process in which cache thrashing in the scalar cache memory 1112 occurs, from the input source code.

Therefore, the program conversion device 100 of the present example embodiment can convert the source code so that the possibility of cache thrashing occurring is reduced when the process indicated by the source code is a process in which cache thrashing occurs in the scalar cache memory 1112.

In addition, the data access conversion availability determination unit 120 determines whether or not the plurality of data can be copied to the single different area in the shared memory 1300. The data access conversion unit 130 converts the source code with respect to the plurality of data determined to be copyable.

The data access conversion unit 130 may convert the source code so that: the vector arithmetic unit 1121 is caused to copy the plurality of data to the single different area whose size is smaller than a sum of sizes of the areas. The data access conversion unit 130 may output either converted source code or the object program to which the source code has been compiled.

The program conversion device 100 of the first example embodiment described above performs detection of cache thrashing, determination of whether or not to perform data access conversion, and conversion of the source code. Note that, depending on the input source code, the program conversion device 100 may omit the detection of cache thrashing and the determination of whether or not to perform data access conversion.

FIG. 16 is an explanatory diagram showing another example of source code in which cache thrashing occurs in the scalar cache memory 1112. In the source code shown in FIG. 16, the method of data access conversion is explicitly specified in the first user instruction line. When the source code shown in FIG. 16 is input, the program conversion device 100 only needs to execute the processing of steps S130 to S140 shown in FIG. 15 according to the specified method.

Figure 17:
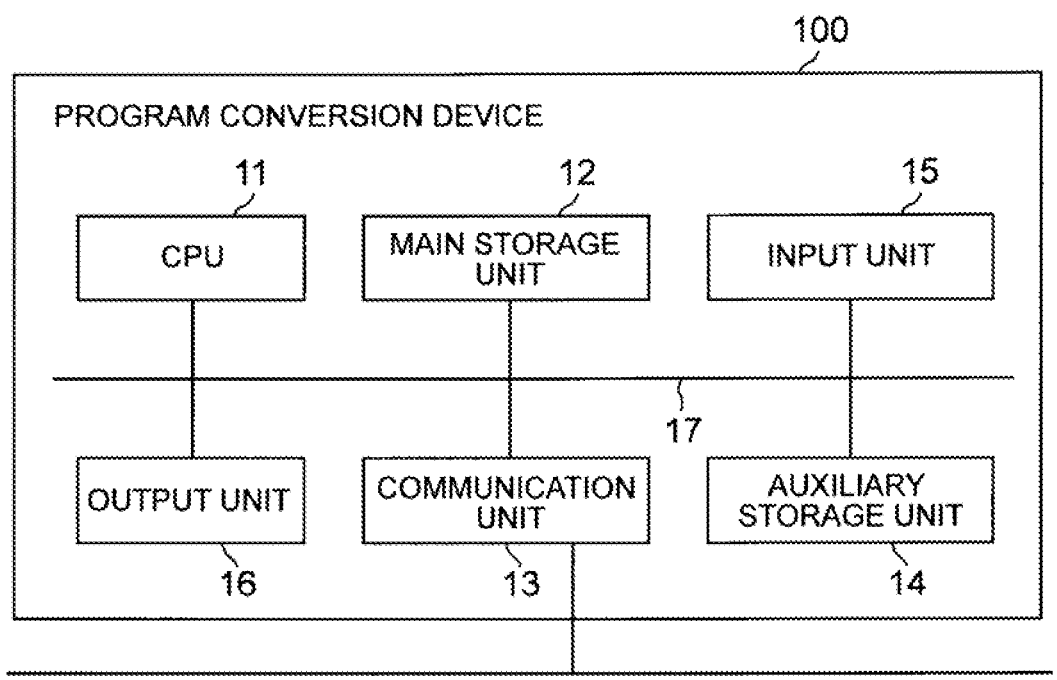
FIG. 17 is an explanatory diagram showing an example of a hardware configuration of the program conversion device 100 according to the present invention.

A specific example of a hardware configuration of the program conversion device 100 according to the present example embodiment will be described below. FIG. 17 is an explanatory diagram showing an example of a hardware configuration of the program conversion device 100 according to the present invention.

The program conversion device 100 shown in FIG. 17 includes a CPU (Central Processing Unit) 11, a main storage unit 12, a communication unit 13, and an auxiliary storage unit 14. The program conversion device 100 also includes an input unit 15 for the user to operate and an output unit 16 for presenting a processing result or a progress of the processing contents to the user.

The program conversion device 100 is realized by software, with the CPU 11 shown in FIG. 17 executing a program that provides a function that each component has.

Specifically, each function is realized by software as the CPU 11 loads the program stored in the auxiliary storage unit 14 into the main storage unit 12 and executes it to control the operation of the program conversion device 100.

The program conversion device 100 shown in FIG. 17 may include a DSP (Digital Signal Processor) instead of the CPU 11. Alternatively, the program conversion device 100 shown in FIG. 17 may include both the CPU 11 and the DSP.

The main storage unit 12 is used as a work area for data and a temporary save area for data. The main storage unit 12 is, for example, RAM (Random Access Memory).

The communication unit 13 has a function of inputting and outputting data to and from peripheral devices through a wired network or a wireless network (information communication network).

The auxiliary storage unit 14 is a non-transitory tangible medium. Examples of non-transitory tangible media are, for example, a magnetic disk, an optical magnetic disk, a CD-ROM (Compact Disk Read Only Memory), a DVD-ROM (Digital Versatile Disk Read Only Memory), a semiconductor memory.

The input unit 15 has a function of inputting data and processing instructions. The input unit 15 is, for example, an input device such as a keyboard or a mouse.

The output unit 16 has a function to output data. The output unit 16 is, for example, a display device such as a liquid crystal display device, or a printing device such as a printer.

As shown in FIG. 17, in the program conversion device 100, each component is connected to the system bus 17.

The auxiliary storage unit 14 stores programs for realizing the thrashing detection unit 110, the data access conversion availability determination unit 120, and the data access conversion unit 130 in the first example embodiment.

The program conversion device 100 may be implemented with a circuit that contains hardware components inside such as an LSI (Large Scale Integration) that realize the functions shown in FIG. 9, for example.

The program conversion device 100 may be realized by hardware that does not include computer functions using elements such as a CPU. For example, some or all of the components may be realized by a general-purpose circuit (circuitry) or a dedicated circuit, a processor, or a combination of these. They may be configured by a single chip (for example, the LSI described above) or by multiple chips connected via a bus. Some or all of the components may be realized by a combination of the above-mentioned circuit, etc. and a program.

In the case where some or all of the components are realized by a plurality of information processing devices, circuits, or the like, the plurality of information processing devices, circuits, or the like may be centrally located or distributed. For example, the information processing devices, circuits, etc. may be realized as a client-server system, a cloud computing system, etc., each of which is connected via a communication network.

Figure 18:
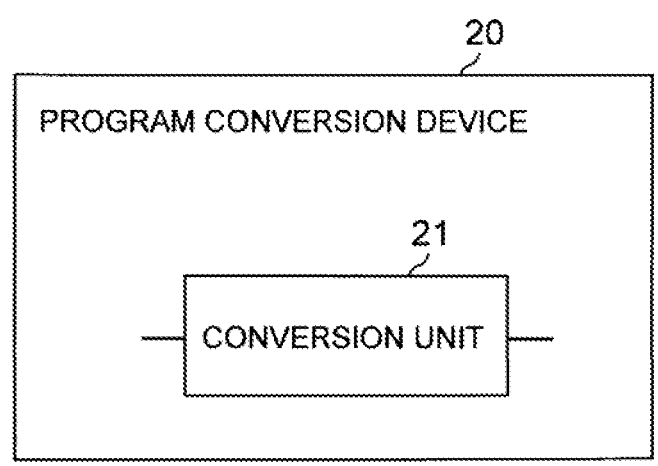
FIG. 18 is a block diagram showing an overview of a program conversion device according to the present invention.
Figure 19:
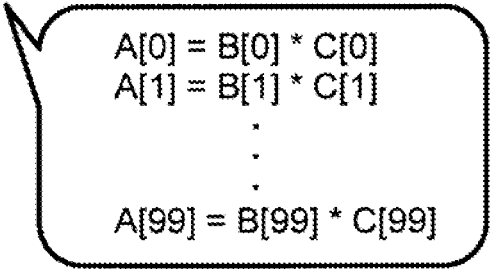
FIG. 19 is an explanatory diagram showing an example of scalar arithmetic and vector arithmetic.

Next, an overview of the present invention will be described. FIG. 18 is a block diagram showing an overview of a program conversion device according to the present invention. The program conversion device 20 according to the present invention is a program conversion device for converting source code that is the generation source of an object program executed by a vector processor (for example, the vector processor 1000), the vector processor including a vector arithmetic unit (for example, the vector arithmetic unit 1121) that performs vector arithmetic, a scalar arithmetic unit (for example, the scalar arithmetic unit 1111) that performs scalar arithmetic, and a shared memory (for example, the shared memory 1300) that can be accessed by either of the vector arithmetic unit and the scalar arithmetic unit, includes a conversion unit 21 (for example, the data access conversion unit 130) which converts the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

With such a configuration, the program conversion device can speed up arithmetic by the vector processor.

The vector processor may include a cache memory (for example, the scalar cache memory 1112) that stores data for scalar arithmetic, among data stored in the shared memory, as cache data, and the process indicated by the source code may be a process in which cache thrashing occurs in the cache memory.

With such a configuration, the program conversion device can reduce the possibility of cache thrashing occurring.

The program conversion device 20 may include a detection unit (for example, the thrashing detection unit 110) which detects from the source code the process in which the cache thrashing occurs in the cache memory.

With such a configuration, the program conversion device can detect a process in which cache thrashing occurs among processes indicated by the source code.

The program conversion device 20 may include a determination unit (for example, the data access conversion availability determination unit 120) which determines whether or not the plurality of data can be copied to the single different area in the shared memory, and the conversion unit may convert the source code with respect to the plurality of data determined to be copyable.

With such a configuration, the program conversion device can copy multiple data without causing interference.

The conversion unit 21 may convert the source code so that: the vector arithmetic unit is caused to copy the plurality of data to the single different area whose size is smaller than a sum of sizes of the areas.

With such a configuration, the program conversion device can reduce the consumption of shared memory.

The conversion unit 21 may output either converted source code or the object program to which the source code has been compiled.

REFERENCE SIGNS LIST

11 CPU
12 Main storage unit
13 Communication unit
14 Auxiliary storage unit
15 Input unit
16 Output unit
17 System bus
20, 100 Program conversion device
21 Conversion unit
110 Thrashing detection unit
120 Data access conversion availability determination unit
130 Data access conversion unit
1000 Vector processor
1100 Vector core
1110 Scalar unit
1111 Scalar arithmetic unit
1112 Scalar cache memory
1120 Vector unit
1121 Vector arithmetic unit
1122 Vector cache memory
1200 Shared cache memory
1300 Shared memory

What is claimed is:

1. A program conversion device for converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, comprising:
   a conversion unit which converts the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

2. The program conversion device according to claim 1, wherein
   the vector processor includes a cache memory that stores data for scalar arithmetic, among data stored in the shared memory, as cache data, and
   the process indicated by the source code is a process in which cache thrashing occurs in the cache memory.

3. The program conversion device according to claim 2, further comprising:
   a detection unit which detects from the source code the process in which the cache thrashing occurs in the cache memory.

4. The program conversion device according to claim 1 further comprising:
   a determination unit which determines whether or not the plurality of data can be copied to the single different area in the shared memory, wherein
   the conversion unit converts the source code with respect to the plurality of data determined to be copyable.

5. The program conversion device according to claim 1, wherein
   the conversion unit converts the source code so that: the vector arithmetic unit is caused to copy the plurality of data to the single different area whose size is smaller than a sum of sizes of the areas.

6. The program conversion device according to claim 1, wherein
   the conversion unit outputs either converted source code or the object program to which the source code has been compiled.

7. The program conversion device according to claim 2, further comprising:
   a determination unit which determines whether or not the plurality of data can be copied to the single different area in the shared memory, wherein
   the conversion unit converts the source code with respect to the plurality of data determined to be copyable.

8. The program conversion device according to claim 3, further comprising:
   a determination unit which determines whether or not the plurality of data can be copied to the single different area in the shared memory, wherein
   the conversion unit converts the source code with respect to the plurality of data determined to be copyable.

9. The program conversion device according to claim 2, wherein
   the conversion unit converts the source code so that: the vector arithmetic unit is caused to copy the plurality of data to the single different area whose size is smaller than a sum of sizes of the areas.

10. The program conversion device according to claim 3, wherein
    the conversion unit converts the source code so that: the vector arithmetic unit is caused to copy the plurality of data to the single different area whose size is smaller than a sum of sizes of the areas.

11. The program conversion device according to claim 4, wherein
    the conversion unit converts the source code so that: the vector arithmetic unit is caused to copy the plurality of data to the single different area whose size is smaller than a sum of sizes of the areas.

12. The program conversion device according to claim 7, wherein
    the conversion unit converts the source code so that: the vector arithmetic unit is caused to copy the plurality of data to the single different area whose size is smaller than a sum of sizes of the areas.

13. The program conversion device according to claim 8, wherein
    the conversion unit converts the source code so that: the vector arithmetic unit is caused to copy the plurality of data to the single different area whose size is smaller than a sum of sizes of the areas.

14. The program conversion device according to claim 2, wherein
    the conversion unit outputs either converted source code or the object program to which the source code has been compiled.

15. The program conversion device according to claim 3, wherein
    the conversion unit outputs either converted source code or the object program to which the source code has been compiled.

16. The program conversion device according to claim 4, wherein the conversion unit outputs either converted source code or the object program to which the source code has been compiled.

17. A program conversion method implemented by a program conversion device for converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, comprising:
converting the source code so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

18. The program conversion method according to claim 17, wherein
the vector processor includes a cache memory that stores data for scalar arithmetic, among data stored in the shared memory, as cache data, and
the process indicated by the source code is a process in which cache thrashing occurs in the cache memory.

19. A non-transitory computer-readable recording medium recording a program conversion program causing a computer to execute:
a conversion process of converting source code that is the generation source of an object program executed by a vector processor, the vector processor including a vector arithmetic unit that performs vector arithmetic, a scalar arithmetic unit that performs scalar arithmetic, and a shared memory that can be accessed by either of the vector arithmetic unit and the scalar arithmetic unit, so that: the vector arithmetic unit is caused to copy a plurality of data, which are stored in separate areas within the shared memory accessed by the scalar arithmetic unit during the process indicated by the source code, to a single different area from the areas in the shared memory; and the scalar arithmetic unit is caused to access the single different area instead of the separate areas.

20. The recording medium according to claim 19, wherein
the vector processor includes a cache memory that stores data for scalar arithmetic, among data stored in the shared memory, as cache data, and
the process indicated by the source code is a process in which cache thrashing occurs in the cache memory.

* * * * *